April 16, 1957     H. H. SANDER     2,788,656
MEANS FOR INVESTIGATING GASES
Filed Nov. 17, 1954

INVENTOR.
Howard H. Sander
BY

United States Patent Office 2,788,656
Patented Apr. 16, 1957

2,788,656

MEANS FOR INVESTIGATING GASES

Howard H. Sander, Albuquerque, N. Mex., assignor, by mesne assignments, to the United States of America as represented by the United States Atomic Energy Commission Application November 17, 1954, Serial No. 469,564

2 Claims. (Cl. 73—24)

The present invention relates to means for ascertaining gas characteristics and more particularly to means which may be utilized for ascertaining the temperature of a gas and the velocity of sound therein.

It is well known that the sound pitch or frequency of vibration produced by a pipe or whistle disposed in a gas is proportional to absolute temperature of the gas and that velocity of sound in the gas varies with gas temperature. Various mechanisms have been devised whereby variations in frequency of vibration may be observed or detected and utilized to determine temperature change, and hence sound velocity change; such mechanisms have, however, generally lacked one or more desirable characteristics, have been difficult to operate, or have been unsatisfactory under usage conditions that are other than ideal.

The present invention aims to overcome difficulties or disadvantages of the above referred to nature by providing new and improved means for ascertaining gas temperature, or velocity of sound in the gas, and to provide such means which is of relatively simple construction and operation and unaffected to any objectionable extent by motion of ambient gases.

An object of the present invention is to provide new and improved means for ascertaining gas temperature, or velocity of sound in gas.

Another object of the invention is to provide improved means for ascertaining gas characteristics which is not objectionably affected by gas motion.

Another object of the invention is to provide improved gas characteristics ascertaining means that requires no particular orientation with respect to any movement of ambient gases.

Another object of the invention is to provide new and improved means for very quickly ascertaining gas temperature or other characteristics.

A still further object of the invention is to provide means for quickly ascertaining gas characteristics that is of relatively simple, inexpensive, sturdy and foolproof construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
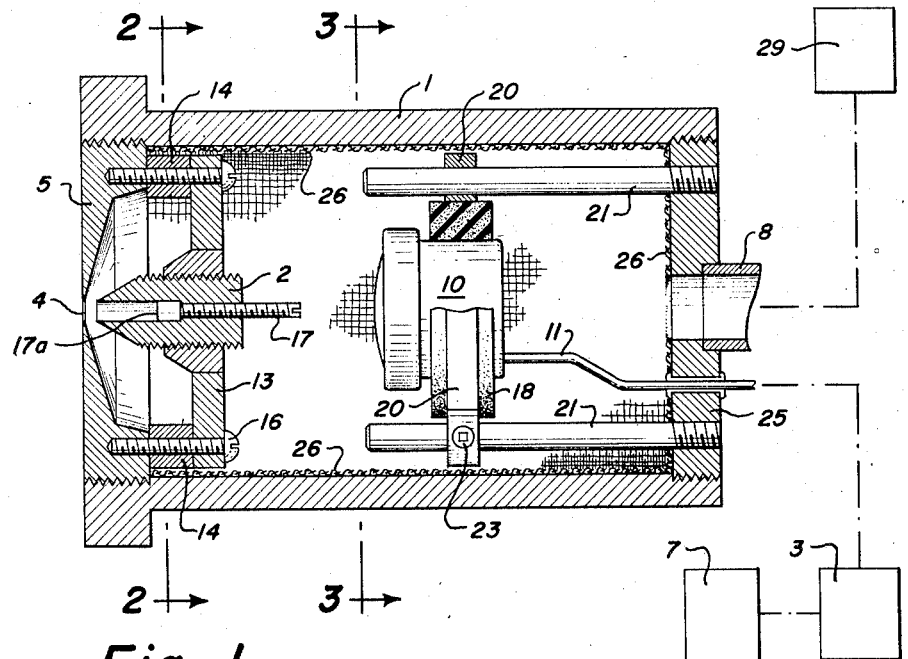
Fig. 1 is a longitudinal sectional view showing a preferred embodiment of the invention.
Figure 2:
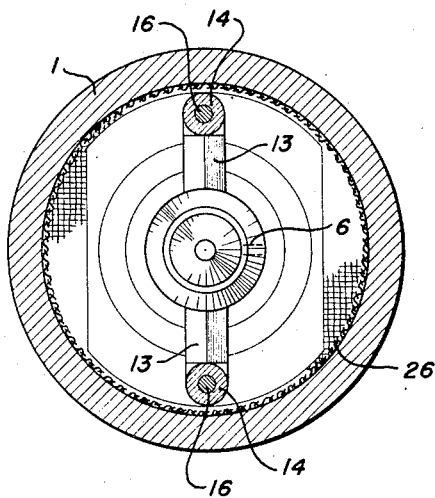
Fig. 2 is a sectional view taken generally along line 2—2 of Fig. 1.
Figure 3:
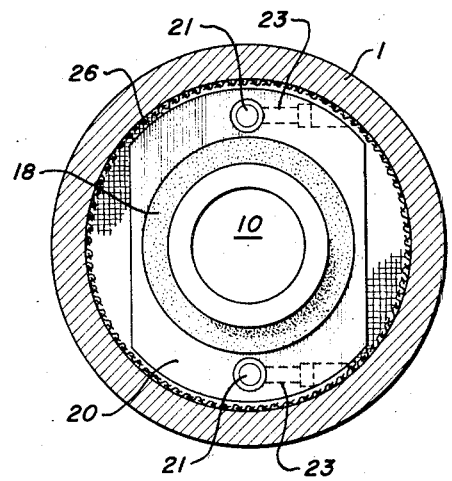
Fig. 3 is a sectional view taken along line 3—3 of Fig. 1.

This device comprises generally a casing 1 containing a centrally disposed pipe or tube 2 having an open end adjacent a small size centrally disposed inlet orifice 4 of an end plate 5 so that evacuation of gas from the interior of casing 1, through outlet or vacuum connection 8, draws air or other gas into the casing 1 through the orifice 4 and past the open end of the pipe 2 to create a tone or whistle. The thus created whistle or tone strikes a centrally disposed microphone 10 within the casing 1 and is converted into electrical impulses that are conveyed by coaxial cable or other output conductor 11 to some suitable signal observing or detecting means, e. g., a frequency modulation discriminator 3 having its output coupled to a galvanometer 7 with galvanometer deflection proportional to vibration frequency of the tone or whistle, or coupled to a magnetic tape recorder. From well known formulae and relationships gas temperature and velocity of sound in the gas may be determined. Galvanometer 7 may be appropriately calibrated for directly indicating temperature, sound velocity, or other characteristics.

The particular output signal continues as long as there is no change in vibrational frequency of the created whistle. If, however, influent gas temperature changes, the frequency of vibration or pitch also changes and the microphone immediately notes the change and proportionally varies the electrical output signal, which is in turn noted and shown by the coupled frequency discriminator-galvanometer or other recording apparatus.

Described in greater detail the present device comprises, as shown, a generally cylindrical cross-section casing 1 having screw threads adjacent one end for engaging complementary threads on orifice plate 5. Orifice plate member 5 may be of any appropriate thickness and cross-sectional configuration but for strength and rigidity preferably tapers outwardly from relatively thin and sharply defined edges of the relatively small influent orifice 4. Pipe or cavity member 2 is carried by a cross bar 13 that rests against spacer members 14 and is secured to the orifice plate by bolts 16; complementary screw threads on the cross bar and cavity member permit adjustment of the latter member with respect to the orifice 4 and a desired position may be retained by set screw 6. Effective length or depth of the cavity may be varied by a longitudinally adjustable rod 17 which threadedly engages the interior of cavity member 2; this construction facilitates varying the tone or vibration frequency of influent gas passing the cavity member and selection of an optimum vibrational frequency for pickup by microphone 10; that is, a resonant condition may be obtained for maximum effect upon microphone 10 or for various ambient gas conditions such as temperature and pressure. The cavity member or tube 2 is preferably composed of some material which has a very low coefficient of thermal expansion, e. g., the alloy invar.

The microphone 10, preferably of the so-called dynamic type as this is of low impedance which affords good results and facilities matching with a coaxial conductor 11, is preferably supported within an annular sponge or foam rubber mounting member 18 carried by bracket 20 and the latter is adjustably mounted on support rods 21 so that it and the microphone may be shifted longitudinally of the casing 1 to some optimum pickup and substantially reflection-free location; an appropriate adjusted position may be retained by tightening set screws 23. A satisfactory microphone is the "DSM-1" type available from the American Microphone Company.

The microphone support rods 21 are threaded into apertures in an end plate 25 and the latter with its associated elements may be threaded as a unit into the casing.

The interior of the casing 1 is preferably lined with felt 26 or other suitable material to obviate or minimize sound reflections within the casing.

With the device set up as disclosed outlet connection 8 may be joined to a conduit which leads to a vacuum pump 29 which withdraws air from the interior of the casing 1 and pulls air into the casing through influent orifice 4 past the open end of whistle cavity or tube member 2. The adjusting rod 17 may be suitably shifted to obtain an optimum tube depth and corresponding frequency vibration or pitch, the shorter the tube the greater being the number of vibrations per unit of time and therefore the higher the frequency. With the gage connected, for example, to a frequency discriminator 3 the latter may be balanced or adjusted for zero output and the vibrational frequency noted which corresponds to the then existing gas temperature. The reading of a galvanometer 7 for the particular frequency corresponding to the then existing temperature should also be noted. Changes in ambient gas temperature effect proportional changes in vibrational frequency and therefore by noting changes in frequency there may be determined corresponding temperature changes.

While any suitable dimensions for the various elements and their relationships may be utilized, excellent results are obtainable by employing a casing 1 with internal diameter of about two inches and length about three and one-quarter inches, sharp edged influent orifice and cavity or tube diameters about seven one-hundredths of an inch, material thickness around the influent orifice about one one-hundredth of an inch, and with the open end of the cavity or tube member 2 spaced about one-sixteenth of an inch from the inner edge defining influent orifice 4. The cavity depth in member 2 is variable, of course, by adjustment of threaded rod 17; in its illustrated position the depth to the end 17a of rod 17 may be about three-eighths of an inch. While any suitable vacuum may be utilized, it is preferable that it be any vacuum such that the pressure within casing 1 always be at least a few pounds per square inch less than the outside atmospheric pressure, or lower than the lowest external pressure anticipated during the course of any measurement or tests (for example, during a shockwave, or instance wherein a change of atmospheric pressure may occur during, and incidental to, the temperature measurement).

In addition to admitting gas to the casing 1 the influent orifice 4 shapes the gas stream for impingement on the edge of cavity member 2. In addition, the small size influent orifice acts as a low frequency filter that eliminates or minimizes external noises, e. g., explosions or shock pressures, which might otherwise reach the microphone 10. Hence vibrational frequency generated by the device is not altered due to external pressure changes or gas movement. Even though large pressure changes may occur externally, the internal casing pressure remains substantially constant or changes very slowly to thus prevent damaging the microphone 10.

The sound output of the cavity member or pipe 2 may be made very powerful so that a microphone of relatively low sensitivity may be employed which reproduces with high output the generated signal but which is relatively insensitive to extraneous external noise.

It will be seen that the present invention provides new and improved means of relatively simple, inexpensive and sturdy construction for very rapidly ascertaining gas temperature or other characteristics, e. g., velocity of sound in the gas. From observed output signals or indications the temperature of the gas or velocity of sound therein may be readily and quickly ascertained, even in instances where there may exist gas movement relative to the device. With the present device it is unnecessary to apply corrections to compensate for movement of ambient gases and no special orientation of the device is necessary with respect to an ambient gas stream.

Response time of the device is very rapid as it is not dependent upon heating of any gage element as in the case of thermometers, thermocouples or resistance wires.

A very desirable feature or advantage is that the resultant signal changes frequency according to temperature changes, and thus the observed output from the microphone is a signal varying in frequency. The discriminator to which this signal may be fed is sensitive only to frequency variations and is insensitive to amplitude variation. Thus changes in signal amplitude, such as might occur from changes in ambient pressure (for example, during a shockwave) will not affect the final observed record. Also, extraneous noise pulses which might be generated by outside occurrences may be eliminated.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device of the character described comprising an imperforate casing having a thin-edge gas influent orifice of small diameter adjacent one end thereof and a gas effluent aperture of larger diameter spaced from said influent orifice for connection with means to withdraw gas from the casing interior, a pipe member enclosed within the casing intermediate said influent orifice and effluent aperture having a single opening at one end thereof, means supporting the pipe member with its open end in unimpeded communication with and in close proximity to but spaced from the thin edge of said influent orifice for creating a tone upon withdrawal of gas from the casing through said effluent aperture and simultaneous drawing of gas into the casing through said influent orifice and past said open end of the pipe member, and means within the casing for supporting a microphone within the casing and at varying distances from said pipe member.

2. A device of the character described comprising an imperforate generally tubular member, an end plate closing one end of the tubular member having a thin-edge inlet orifice of small diameter therethrough adjacent a central portion thereof, a pipe member enclosed within the tubular member having an opening at only one end thereof and with said open end disposed toward and in unimpeded communication with and in close proximity to but spaced from the edge of said inlet orifice, an end plate closing an opposite end of the tubular member having an outlet aperture of considerably greater cross sectional area than that of said inlet orifice therethrough for connection with means to withdraw gas from the interior of the device and simultaneously draw gas through said inlet orifice and past said open end of the pipe member to thereby create a sound, a microphone within the tubular member intermediate said end plates spaced from the tubular member for converting sound vibrations to electrical impulses, and an electrical conductor coupled with the microphone for connecting it with indicating means.

References Cited in the file of this patent

UNITED STATES PATENTS

| | | |
|---|---|---|
| 1,528,586 | Tate | Mar. 3, 1925 |
| 1,530,899 | Limon | Mar. 24, 1925 |
| 2,158,537 | Garratt | May 16, 1939 |
| 2,283,750 | Mikelson | May 19, 1942 |
| 2,458,164 | Hill et al. | Jan. 4, 1949 |
| 2,582,232 | Cesaro et al. | Jan. 15, 1952 |

FOREIGN PATENTS

| | | |
|---|---|---|
| 888,937 | Germany | Sept. 7, 1953 |

OTHER REFERENCES

Article: "Use of the Whistle in the Purging of Gas Lines for Measuring Density and Gas"; by E. Schumacher, pub. in GAS, Feb. 1939, pp. 17, 18 and 58.